Figure 1:
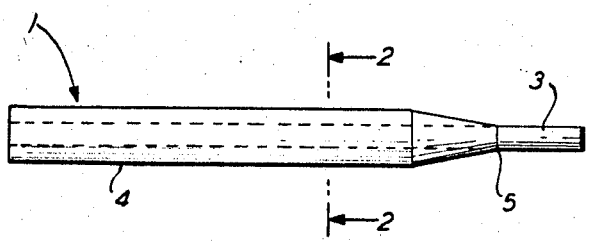

July 1, 1969

K. E. DORSCHU ET AL 3,453,142

WELDING ELECTRODE AND COMPOSITION

Filed March 14, 1966

INVENTORS
KARL E. DORSCHU
JEROME M. ROLNICK
BY
ATTORNEY

//<br>
United States Patent Office 3,453,142
Patented July 1, 1969

---

3,453,142
WELDING ELECTRODE AND COMPOSITION
Karl E. Dorschu, Basking Ridge, N.J., and Jerome M. Rolnick, Baltimore, Md., assignors to Air Reduction Company, Incorporated, New York, N.Y., a corporation of New Jersey
Filed Mar. 14, 1966, Ser. No. 534,126
Int. Cl. B44d 1/20; B23k 35/22
U.S. Cl. 117—205     7 Claims This invention relates to flux coated arc welding electrodes and more particularly relates to improvements in coated electrodes for use in the arc welding of high yield strength and high impact resistant-low alloy steels.

The progress of the art of steel making has recently provided low alloy steel plate of high yield strengths (130–150,000 p.s.i.) and high impact resistances, making necessary the accompanying development of welding electrodes which will produce weld metal in the as-welded condition having yield strength and impact resistance in the range of the steels already available and which will anticipate still further improvements in such steels.

The composition of the coating which surrounds the core wire of a coated electrode is of critical importance in developing an electrode which is capable of depositing weld metals to join the new high strength steels. The electrode coating is designed to provide the cleaning and deoxidizing agents required in arc welding. As the coating is consumed, it provides a gaseous atmosphere that protects the end of the electrode as well as the molten weld pool. This atmosphere excludes harmful oxygen and nitrogen from the molten weld area, while the residue of the consumed coating forms a slag to cover deposited weld metal.

The slag that is formed also serves to exclude air from the weld until it has cooled to a point where oxides and nitrides will no longer be formed. In addition, the slag also serves to slow the cooling and prevent the entrapment of impurities.

The coating serves to improve the deposit and general performance of the welding electrode. It provides an easier striking arc, helps to maintain the arc, regulates depth of penetration, stabilizes the arc, and maintains the soundness of the weld.

Sometimes the coating adds alloying agents to the weld metal or restores lost alloys. The resultant slag not only protects the weld bead but assists in shaping it. This slag, formed by the combination of coating materials, must also be easily removable.

In addition to these functions which it provides during the actual welding operation, the coating serves as an insulation for the electrode's core wire, and it may determine the voltage required to sustain the arc. It may even determine the voltage required to sustain the arc. It may even determine the welding position best suited for the electrode.

It can thus be seen that composition of the coating is extremely important. The coating should have a melting point somewhat lower than the core wire or the base metal. It must also be of a lower density in order to be quickly and thoroughly expelled from the molten weld metal. Where the electrode is to be used for overhead or vertical welding, the slag formed from the melted coating must have a high viscosity so that it will adhere and freeze in a gravity-defying position.

It is therefore an object of this invention to provide a new electrode coating composition which, when applied to a core wire to form a composite electrode, will produce a weld metal of unusually high yield strength and impact resistance.

A further object is to improve the yield strength and impact resistance of welds in high yield strength, high impact resistance, low alloy steels to a point where these properties of the welds approach the yield strength and impact resistance of the steels they join.

An additional object is to provide a coated electrode that will insure the desired properties in the weld metal after the weld metal has been deposited without subsequent heat treatment.

Yet another object is to provide a weld metal composition which in the as-deposited condition has a high yield strength and impact resistance.

According to the present invention a coated electrode is provided haivng a mild steel core wire containing a maximum by weight of 0.020% sulpur and phosphorus each and a coating composition as hereinafter described which is eminently suitable for effecting welds in high yield strength-low alloy steels. Preferably, the core wire should have as little sulfur and phosphorus as possible and, in most cases, both the sulfur and phosphorus content should be less than 0.015%. The coating composition of the present invention is comprised generally of the following ingredients in percent by weight:

| | Percent by wt. |
|---|---|
| Iron | 0–35.0 |
| Silicon | 1.0–3.0 |
| Manganese | 4.0–9.0 |
| Chromium | 1.5–4.0 |
| Molybdenum | 0.8–2.0 |
| Nickel | 3.5–7.0 |
| Copper | 0–2.0 |
| Vanadium | 0–0.1 |
| Titanium | 0–1.5 |
| Sodium silicate and/or potassium silicate | 5.0–12.0 |
| Titanium dioxide | 0–10.0 |
| Insoluble silicates such as sand, clay, and kyanite | 0–12.0 |
| Other potassium bearing compounds such as potassium titanate, potassium carbonate, feldspar | 0–8.0 |
| Calcium bearing compounds such as calcium carbonate, fluorspar | 30.0–60.0 |
| Organics such as hydroxy ethyl cellulose, and sodium carboxymethyl cellulose gum | 0–2.0 |

Figure 2:
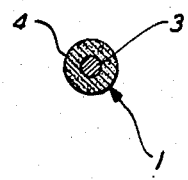

Other objects, features, and advantages of the invention will be apparent from the following detailed description of the various embodiments of the invention considered in conjunction with the accompanying drawings in which:

FIG. 1 shows a side elevational view partly in cross-section of a welding electrode constructed in accordance with the present invention; and FIG. 2 is a cross-sectional view of FIG 1 taken in approximately the line 2—2 thereof.

In the drawings, an electrode shown generally at 1 is comprised of a central core member 3 which is a mild steel wire as hereinafter described. Surrounding this wire is a coating 4 of a composition and of the respective weights as disclosed herein. This coating 4 terminates short of one end of the core 3, as at 5, so that electrical contact can be made of the core 3 by means of conventional electrode holders.

Recent developments in high strength-low alloy steels, such as United States Steel's 5-Ni-Cr-Mo-V plate which has a yield strength of approximately 140,000 p.s.i., have resulted in the necessity of devising weld metal compositions and means for depositing such weld metal compositions which will have a yield strength of 130–150K s.i. (thousands of pounds per square inch) and which will have a toughness exceeding 20 ft. lb. at −60° F. as measured by the standard Charpy V-notch touchness test.

The welding electrodes of this invention are particularly adapted to deposit a weld metal which has a yield strength of 130–150K s.i. and a toughness of 20 ft. lb. at −60° F.

In order that new high strength steels may be joined by a weld which will exhibit complementary strength, it has been determined that the electrode of this invention should produce a weld metal in the as-welded condition having the percent weight analysis of 0.044 to 0.093 carbon, 1.81 to 2.29 manganese, 0.20 to 0.50 silicon, 0.80 to 1.50 chromium, 0.40 to 0.95 molybdenum, 0.00 to 0.06 vanadium, 0.00 to 0.85 copper, 1.74 to 2.95 nickel, 0.00 to 0.020 titanium, and the balance iron.

For the best weld metal properties, the desired weld metal composition is 0.05 to 0.09 carbon, 1.8 to 2.2 manganese, 0.30 to 0.50 silicon, 0.8 to 1.1 chromium, 0.4 to 0.6 molybdenum, 1.7 to 2.5 nickel, 0.002 to 0.017 titanium, and balance iron.

As previously pointed out, in order to produce the above weld metals from the coated electrodes, a mild steel core wire having 0.020% or less phosphorus and sulfur each is necessary, and 0.015% or less of phosphorus and sulfur each is preferred to obtain maximum properties in the weld metal. It should be noted that these percentages, and all other percentages referred to herein, are percentages by weight unless otherwise specified.

The coating for the mild steel core has the composition as set forth hereinabove. It is to be understood, however, that it is not necessary for any or all of the alloying metals in the composition to be inserted in their pure form, but they may also be incorporated in alloy forms. For example, alloys such as ferrosilicon, high carbon ferromanganese, low carbon ferromanganese, ferrochromium, ferromolybdenum, ferrovanadium, ferrotitanium, and silicomanganese could be used as the source of the alloying elements. A particularly suitable form of alloying materials and other ingredients, and relative percentages by weight thereof for producing an American Welding Society (AWS) Class EXXX18 electrode are as follows:

CLASS EXXX18 ELECTRODE COATING COMPOSITIONS

Iron powder _____ 15.0–19.5
Ferrosilicon _____ 2.3–4.8
Manganese metal _____ 4.9–6.3
High carbon ferromanganese _____ 0–2.9
Ferrochromium _____ 2.8–4.7
Ferromolybdenum _____ 1.7–2.7
Nickel powder _____ 3.8–6.7
Copper powder _____ 0–1.7
Ferrovanadium _____ 0–0.2
Ferrotitanium _____ 0–4.0
Pigment titanium dioxide _____ 0–1.5
Titanium dioxide (rutile) _____ 0–5.0
Calcium fluoride _____ 10.0–35.0
Calcium carbonate _____ 10.0–35.0
Mineral silicates _____ 0–8.0
Organics _____ 0–2.0
Sodium silicates and/or potassium silicate _ 3–10.0
Potassium bearing compounds other than potassium silicate _____ 0–8.0

The metal powders and metal alloys are generally in the form of a finely ground powder which will pass through a 30 mesh screen.

The potassium bearing compounds are, for example, potassium titanate, potassium carbonate, or feldspar.

The organic present in small amounts may be hydroxyethyl cellulose or sodium carboxymethyl cellulose gum.

The mineral silicates may be selected from any of the large number of insoluble silicates but, generally, will include kyanite, sand, and bentonite clay.

No sharp distinction can be drawn as to the function of any single ingredient of the electrode coating composition. Each ingredient, directly or indirectly, influences one or more functions of the composite coating. However, in general, calcium fluoride, calcium carbonate, kyanite, titanium dioxide, sand (silicon dioxide) and potassium titanate act as slag forming materials.

Ferromanganese, ferrosilicon, and silicomanganese compounds usually function in the dual capacity of deoxidizers and alloying additions. The hydroxyethyl cellulose and bentonite clay are extrusion aids in forming the electrode. The sodium silicate and/or potassium silicate is utilized, in liquid form, as a binder. The potassium carbonate is added to stabilize the arc in the welding operation.

Preferred embodiments of the coating which have been found to carry out the objectives of the invention are as follows:

| Example | Percent | |
|---|---|---|
|  | I | II |
| Calcium fluoride | 20.9 | 20.9 |
| Calcium carbonate | 22.4 | 22.4 |
| Mineral silicates | 4.6 | 4.6 |
| Organics | 1.0 | 1.0 |
| Potassium bearing compounds | 3.8 | 3.8 |
| Pigment TiO$_2$ | 1.5 | 1.5 |
| Dried sodium silicate | 6.4 | 6.4 |
| Iron powder | 17.0 | 18.7 |
| Ferrotitanium | 3.2 | ------ |
| Ferrosilicon | 3.9 | 4.8 |
| Manganese metal | 5.6 | 5.9 |
| High carbon ferromanganese | 0.2 | 0.5 |
| Ferrochromium | 2.9 | 2.9 |
| Ferromolybdenum | 1.9 | 1.9 |
| Nickel powder | 4.7 | 4.7 |
|  | 100.0 | 100.0 |

EXAMPLE III

|  | Percent |
|---|---|
| Calcium fluoride | 22.7 |
| Calcium carbonate | 22.7 |
| Pigment TiO$_3$ | 1.3 |
| Rutile | 4.6 |
| Organics | 0.8 |
| Iron powder | 19.4 |
| Ferrosilicon | 4.5 |
| Manganese metal | 6.0 |
| Ferrochromium | 2.9 |
| Ferromolybdenum | 2.1 |
| Nickel powder | 4.6 |
| Dried potassium silicate | 8.4 |
|  | 100.0 |

EXAMPLE IV

|  | Percent |
|---|---|
| Calcium fluoride | 22.4 |
| Calcium carbonate | 26.2 |
| Mineral silicates | 10.0 |
| Organics | 0.6 |
| Potassium bearing compounds | 0.9 |
| Pigment TiO$_2$ | 5.5 |
| Ferrotitanium | 3.1 |
| Ferrosilicon | 3.1 |
| Manganese metal | 8.3 |
| Ferrochrome | 3.2 |
| Ferromolybdenum | 2.5 |
| Nickel powder | 5.2 |
| Dried sodium silicate | 4.8 |
| Dried potassium silicate | 4.2 |
|  | 100.0 |

The above compositions all compositions referred to herein, are the dry compositions after baking.

It should be noted that the coating compositions set forth in Examples I, II, and III are compositions for AWS Class EXXX18 electrodes (low hydrogen iron powder), whereas the composition of Example IV is for AWS Class EXXX15 electrodes (low hydrogen lime).

In general, in the case of an AWS Class EXXX18 electrode, the ratio of coating to core wire for a 5/32 in. wire is about 35% by weight coating to 65% by weight core wire. The percentage of coating may vary 2% or 3% either way, with proper adjustment of ferroalloys in the coating. In other words, the ratio of the coating to core wire may be in the range of 32% to 38% coating and 68% to 62% wire. For a 3/16 in. diameter wire, the weight of the coating may drop as low as 28% of the total weight of the electrode, whereas for a 1/8 in. diameter core wire the coating may comprise as much as 42% of the total weight of the electrode.

In the manufacture of an AWS Class EXXX15 electrode, the weight of the coating may be as little as 26% of the weight of the electrode.

In preparing electrodes which utilize the coating composition of this invention, the coating ingredients in powdered form are dry mixed in a suitable mixer such as a Muller type mixer for about 10 minutes. Next, the proper quantity of liquid silicate binder for a normal extrusion pressure is added to the mix and mixing is continued for another 10 minutes. The wet mix is then placed in a hydraulic extrusion press where it is extruded onto the steel core wire as both coating and wire pass through a die of a size which gives the desired thickness and amount of coating. For example, when a mild steel core wire having less than 0.020 sulfur and phosphorus was coated, the die diameter normally used for a 5/32 in. diameter wire was 0.250 in., which resulted in a finished outside electrode diameter after baking of 0.247 in. to 0.254 in.

Impact tests of deposited weld metals from electrodes having the coating compositions specified in Examples I–IV were run using the standard Charpy V-notch test following the procedure prescribed by the American Society for Testing Materials. In each case, the toughness was found to exceed 20 ft. lb. at −60° F. The yield strength of the weld metals deposited from electrodes formed in accordance with the three examples was found to exceed 130K. s.i. In addition, the weld metal composition in each was found to be within the range as prescribed hereinabove. For example, when the Example I electrode was deposited and tested by the standard techniques described below, the weld metal analysis by weight was 0.069 carbon, 1.94 manganese, 0.35 silicon, 2.14 nickel, 0.86 chromium, 0.93 molybdenum, 0.012 phosphorus, and 0.012 sulfur.

In addition to the electrodes having coatings as specified in Examples I–IV, many other electrodes were manufactured in accordance with the teachings of this invention. The following table illustrates the weld metal properties obtained when a number of these electrodes were deposited and tested in the same manner as were the Example I–IV electrodes.

MECHANICAL PROPERTIES OF COVERED ELECTRODE WELD METALS

| Electrode No. | Yield strength (0.2% offset, K s.i.) | Charpy V-notch energy absorption, ft.-lb. | |
|---|---|---|---|
| | | +30° F. | −60° F. |
| 1 | 144 | 33 | 22 |
| 2 | 143 | 31 | 22 |
| 3 | 140 | 36 | 23 |
| 4 | 140 | 38 | 30 |
| 5 | 137 | 32 | 25 |
| 6 | 141 | 29 | 24 |
| 7 | 148 | 31 | 23 |
| 8 | 146 | 32 | 20 |
| 9 | 141 | 34 | 26 |
| 10 | 135 | 30 | 21 |
| 11 | 145 | 32 | 25 |
| 12 | 146 | 33 | 23 |

We claim:

1. A coating composition for coated electrodes comprising in percent by weight 0 to 1.5 titanium, 0 to 35 iron, 1.0 to 3.0 silicon, 4.0 to 9.0 manganese, 1.5 to 4.0 chromium, 0.8 to 2.0 molybdenum, 3.5 to 7.0 nickel, 0 to 2.0 copper, 0 to 0.1 vanadium, 5.0 to 12.0 sodium silicate or potassium silicate, 0 to 12.0 insoluble silicates, 0 to 8.0 potassium-bearing compounds other than potassium silicate, 30.0 to 60.0 calcium-bearing compounds, and 0 to 2.0 organics.

2. A coated welding electrode comprised of a mild steel core and a coating, said coating comprising slag-forming materials, alloying materials, deoxidizing materials, extrusion aids, and a binder, said alloying materials consisting essentially of, in percent by weight 0 to 1.5 titanium, 0 to 35 iron, 1.0 to 3.0 silicon, 4.0 to 9.0 manganese, 1.5 to 4.0 chromium, 0.8 to 2.0 molybdenum, 3.5 to 7.0 nickel, 0 to 2.0 copper, and 0 to 0.1 vanadium.

3. A welding electrode as in claim 2 wherein said metallic core comprises a mild steel core having a maximum of 0.015% by weight sulfur and 0.015% by weight phosphorus.

4. A coated welding electrode comprising a mild steel core and a coating, said core containing less than 0.02% by weight phosphorus and sulfur, the ratio of said core and coating being about 26% to 42% by weight coating, and 58% to 74% by weight core, said coating consisting essentially of, in percent by weight, 0 to 1.5 titanium, 0 to 35 iron, 1.0 to 3.0 silicon, 4.0 to 9.0 manganese, 1.5 to 4.0 chromium, 0.8 to 2.0 molybdenum, 3.5 to 7.0 nickel, 0 to 2.0 copper, 0 to 0.1 vanadium, 5.0 to 12.0 sodium silicate or potassium silicate, 0 to 12 insoluble silicates, 0 to 8.0 potassium-bearing compounds other than potassium silicate, 30.0 to 60.0 calcium-bearing compounds, and 0 to 2.0 organics.

5. A coated welding electrode comprising a mild steel core and a coating, said core containing less than 0.02% by weight phosphorus and sulfur, the ratio of said core and coating being about 32% to 38% by weight coating and 68% to 62% by weight core, said coating comprising slag forming materials, alloying materials, deoxidizing materials, extrusion aids, and a binder, said alloying materials consisting essentially of, in percent by weight of the coating, 0 to 1.5 titanium, 0 to 35 iron, 1.0 to 3.0 silicon, 4.5 to 9.0 manganese, 1.5 to 4.0 chromium, 0.8 to 2.0 molybdenum, 3.5 to 7.0 nickel, 0 to 2.0 copper, and 0 to 0.1 vanadium.

6. A coated welding electrode capable of depositing a high strength weld metal in the as-welded condition having the percent weight analysis of 0.044 to 0.093 carbon, 1.81 to 2.29 manganese, 0.20 to 0.50 silicon, 0.80 to 1.50 chromium, 0.40 to 0.95 molybdenum, 0.0 to 0.06 vanadium, 0 to 0.85 copper, 1.74 to 2.95 nickel, 0 to 0.020 titanium, balance iron, said electrode comprising a mild steel core and a coating, said core containing less than 0.02% by weight phosphorus and sulfur, the ratio of said core and coating being about 26% to 42% by weight coating and 58% to 74% by weight core, said coating consisting essentially of, in percent by weight, 0 to 1.5 titanium, 0 to 35 iron, 1.0 to 3.0 silicon, 4.5 to 9.0 manganese, 1.5 to 4.0 chromium, 0.8 to 2.0 molybdenum, 3.5 to 7.0 nickel, 0 to 2.0 copper, 0 to 0.1 vanadium, 5 to 12 sodium silicate or potassium silicate, 0 to 12 insoluble silicates, 0 to 8 potassium-bearing compounds other than potassium silicate, 30 to 60 calcium-bearing compounds, and 0 to 2 organics.

7. A coated welding electrode capable of depositing a high strength weld metal in the as-welded condition having the percent weight analysis of 0.05 to 0.09 carbon, 1.8 to 2.2 manganese, 0.30 to 0.50 silicon, 0.8 to 1.1 chromium, 0.4 to 0.6 molybdenum, 1.7 to 2.5 nickel, 0.002 to 0.017 titanium, balance iron, said electrode comprising a mild steel core and a coating, said core containing less than 0.015% by weight phosphorus and sulfur each, the ratio of said core and coating being about 28% to 42% by weight coating and 72% to 58% by weight core, said coating consisting essentially of in percent by weight, iron powder 15.0 to 19.5, ferrosilicon 2.3 to 4.8, manganese metal 4.9 to 6.3, high carbon ferromanganese 0 to 2.9, ferrochromium 2.8 to 4.7, ferromolybdenum 1.7 to 2.7, nickel powder 3.8 to 6.7, copper powder 0 to 1.7, ferrovanadium 0 to 0.2, ferrotitanium 0 to 4.0, pigment titanium dioxide 0 to 1.5, titanium dioxide (rutile) 0 to 5.0, calcium fluoride 10.0 to 35.0, calcium carbonate 10.0 to 35.0, mineral silicates 0 to 8.0, organics 0 to 2.0, sodium silicates and/or potassium silicates 3 to 10.0, and potassium bearing compounds other than potassium silicate 0 to 8.0.

References Cited

UNITED STATES PATENTS 2,789,924   4/1957   Jessen _____ 117—207

WILLIAM L. JARVIS, *Primary Examiner.*

U.S. Cl. X.R.

117—206, 207; 148—24; 219—146